July 23, 1929.  G. K. SPITZENBERG  1,722,063
HAND HOE
Filed Sept. 30, 1925
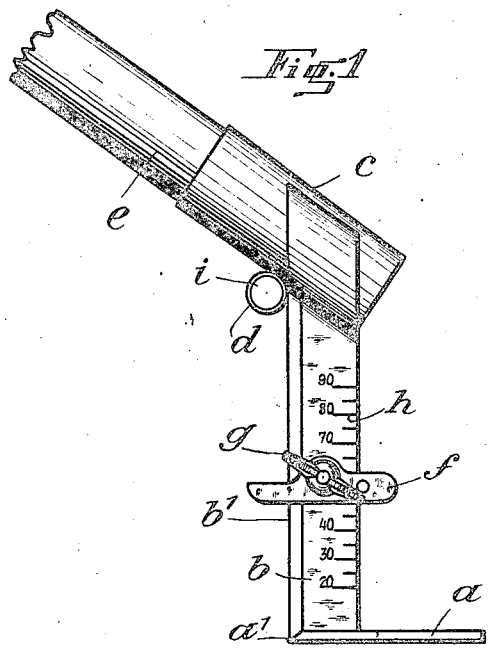
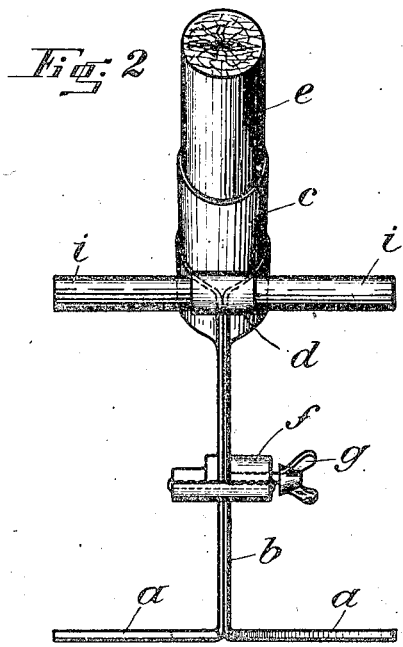
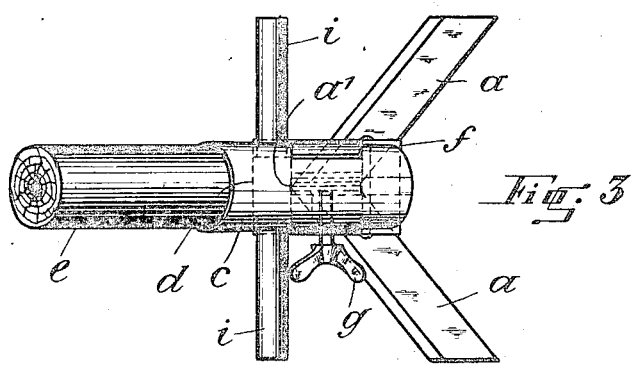
Inventor:
Georg Karl Spitzenberg
by:
Cooke, Kehlenbeck & Farley
Attorneys.

Patented July 23, 1929.

1,722,063

UNITED STATES PATENT OFFICE.

GEORG KARL SPITZENBERG, OF ZACKERICK, GERMANY.

HAND HOE.

Application filed September 30, 1925, Serial No. 59,555, and in Germany October 4, 1924.

My invention relates to improvements in hand hoes, and more particularly in hand hoes such as are used for weeding and for loosening the soil and which consist of a blade fixed to a suitable handle adapted to be moved through the soil and a short distance below the surface thereof for cutting off the roots of the weed. The object of the improvements is to provide an implement of this type which is effective in operation, and with this object in view my invention consists in constructing the blade of the hoe in two sections meeting at a suitable angle. Another object of the improvements is to provide an apparatus by means of which the depth of the blade below the surface of the soil can be ascertained while using the hoe, and with this object in view my invention consists in providing the handle with a vertically adjustable member designed to be moved over the soil for indicating the position of the blade relatively to the surface of the soil. Other objects of the invention will be understood from the following description.

For the purpose of explaining the invention an example embodying the same has been shown in the accompanying drawing, in which the same reference characters have been used in all the views to indicate corresponding parts. In said drawing, Fig. 1, is an elevation showing the hoe with a part of the pole or handle broken away, Fig. 2, is an elevation looking from the left in Fig. 1, and Fig. 3, is a top-plan view of Fig. 1.

In the example shown in the drawing the hoe consists of a blade made in two sections $a$ meeting at an obtuse angle and formed with a cutting edge at their front sides. As shown the said sections $a$ are made integral with two branches $b$ of a standard rigidly secured to each other by suitable means and fixed at their top end to a sleeve $c$ carried by a pole $e$. The branches $b$ are made from flat iron or steel and they are disposed with their flat portions within a plane dividing the angle of the sections $a, a$ into halves. The pole $e$, which is inclined upwardly and forwardly from the vertex of the angle of the blade sections $a, a$ also has its axis disposed within the said plane, so that when pulling the hoe through the soil the resistance of the branches $b$ is reduced to a minimum. Preferably the branches $b$ are ground to an edge, as is shown in Fig. 1 at $b^1$.

The upright $b$ has a gauge or shoe $f$ clamped thereto by means of a wing nut $g$, and the said shoe is adjustable in vertical directions, the distance of the bottom part of the shoe from the blade $a$, $a$ being indicated by scale marks $h$. Further, a rod $i$ having a length equal to the distance between the outer ends of the blade $a$ is fixed to a sleeve $d$ secured to the top part of the standard $b$. For weeding or otherwise cultivating the soil the blade of the hoe is passed below the surface of the soil and pulled through the same by means of the pole $e$. Thereby the roots of the weed are cut, so that the weed is destroyed. The preferred depth of the blade $a$ depends on the length of the roots of the weed, and for enabling the gardener to hold the blade in the proper position the shoe $f$ is set the desired distance away from the blade, and the hoe is held so that the said shoe slides over the ground or a slight distance away therefrom. The rod $i$ indicates the lateral extent of the blade $a$, which enables the gardener to weed between rows of plants without injuring the roots thereof. By the ends of the blade $a$ the soil is loosened near the roots of the plants.

I claim:

1. A hand pulled hoe comprising a pair of thin flat members, each having a horizontal smooth blade portion and a vertical standard portion in perpendicular relation thereto, said members together having an inverted T-shape in front elevation and being secured together with their standard portions in contacting engagement and provided with a vertical cutting edge, and their blade portions extending rearwardly at an angle from said standard, the latter being located at the vertex of, and bisecting said angle, and a handle secured to said standard.

2. A hand pulled hoe comprising a pair of members, each having a blade portion, an inclined handle securing portion and a standard portion perpendicular to the blade portion located between and connecting the blade and handle securing portions, said members being connected together to form an unitary structure of inverted T-shape in front elevation with said standard portions in aligned juxtaposition and with said blade portions diverging rearwardly from said standard, the forward edges of said blade and standard portions being sharpened to a cutting edge, and a pulling handle secured in said handle securing portions and extending forwardly and upwardly therefrom.

3. In a hand pulled hoe comprising a pair of smooth, flat blade portions arranged at an angle to each other in a common horizontal plane, to form a V-shaped structure when viewed from above, the outer sides of the legs of the V being sharpened to form a cutting edge, a vertical standard secured to said blade portions in perpendicular relation thereto and at the apex of said V and located substantially in the central bisecting plane thereof, the outer edge of said standard also being sharpened to provide a cutting edge, a handle secured to said standard in inclined relation thereto with its longitudinal axis extending forwardly of said apex and lying approximately in said plane, a gauge slidably mounted on said standard, means for securing said gauge at different adjusted positions relatively to the blade portions, and a scale for indicating the distance between said gauge and blade portions.

4. A hand pulled hoe, comprising a cutting device including a blade, a handle fixed to said cutting device and carrying adjacent to but spaced above said blade, a transverse member having a length equal to the transverse length of said blade, said member having its outer ends in vertical register with the outer edges of said blade, whereby said member serves as an indicator for determining the cutting path and operating position of said blade when the latter is below the top of the ground.

In testimony whereof, I hereunto affix my signature.

GEORG KARL SPITZENBERG.